United States Patent
Bourdelais et al.

(10) Patent No.: US 6,261,994 B1
(45) Date of Patent: *Jul. 17, 2001

(54) REFLECTIVE IMAGING DISPLAY MATERIAL WITH BIAXIALLY ORIENTED POLYOLEFIN SHEET

(75) Inventors: Robert P. Bourdelais, Pittsford; Alphonse D. Camp, Rochester; Peter T. Aylward, Hilton, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/156,293

(22) Filed: Sep. 17, 1998

(51) Int. Cl.⁷ .............................. B41M 5/35; B41M 5/38
(52) U.S. Cl. .................... 503/227; 428/195; 428/315.5; 428/910
(58) Field of Search ................... 8/471; 428/195, 428/913, 914, 315.5, 910; 503/227

(56) References Cited

U.S. PATENT DOCUMENTS

| | | | |
|---|---|---|---|
| 3,944,699 | 3/1976 | Mathews et al. | 428/220 |
| 4,187,113 | 2/1980 | Mathews et al. | 430/533 |
| 4,283,486 | 8/1981 | Aono et al. | 430/505 |
| 4,632,869 | 12/1986 | Park et al. | 428/315.5 |
| 4,758,462 | 7/1988 | Park et al. | 428/213 |
| 4,900,654 | 2/1990 | Pollock et al. | 430/533 |
| 4,912,333 | 3/1990 | Roberts et al. | 250/487.1 |
| 4,977,070 | 12/1990 | Winslow | 430/510 |
| 5,055,371 | 10/1991 | Lee et al. | 430/126 |
| 5,100,862 | 3/1992 | Harrison et al. | 503/227 |
| 5,212,053 | 5/1993 | McSweeney et al. | 430/503 |
| 5,244,861 | 9/1993 | Campbell et al. | 503/227 |
| 5,387,501 | 2/1995 | Yajima et al. | 430/533 |
| 5,389,422 | 2/1995 | Okazaki et al. | 428/141 |
| 5,466,519 | 11/1995 | Shirakura et al. | 428/323 |
| 6,020,116 * | 2/2000 | Camp et al. | 430/536 |

FOREIGN PATENT DOCUMENTS

| | | |
|---|---|---|
| 0 662 633 A1 | 12/1995 | (EP) . |
| WO 94/04961 | 3/1994 | (WO) . |

* cited by examiner

*Primary Examiner*—Bruce H. Hess
(74) *Attorney, Agent, or Firm*—Paul A. Leipold

(57) ABSTRACT

The invention relates to an imaging element comprising a transparent polymer base, at least one layer of biaxially oriented polyolefin sheet and at least one image layer wherein said polymer sheet has a stiffness of between 20 and 100 millinewtons, and said biaxially oriented polyolefin sheet has a spectral transmission of less than 15%.

33 Claims, No Drawings

REFLECTIVE IMAGING DISPLAY MATERIAL WITH BIAXIALLY ORIENTED POLYOLEFIN SHEET

FIELD OF THE INVENTION

This invention relates to imaging materials. In a preferred form it relates to base materials for reflective display.

BACKGROUND OF THE INVENTION

It is known in the art that imaging display materials are utilized for advertising as well as decorative displays of images. Since these display materials are used in advertising, the image quality of the display material is critical in expressing the quality message of the product or service being advertised. Further, a display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact display material are a slight blue density minimum, durability, sharpness, and flatness. Cost is also important, as photographic display materials tend to be expensive as the imaging process is equipment intensive and requires processing chemicals. For imaging display materials, traditional paper bases are undesirable as they suffer from a lack of durability for the handling and captured display of large format images. The use of display materials such as lithographic prints or ink jet prints could be expanded if image quality was improved.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. The formation of a suitably smooth surface would also improve image quality as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials, as well as tint materials. It would be desirable if the optical brightener, whitener materials, and tints, rather than being dispersed throughout the single layer of polyethylene, could be concentrated nearer the surface of the layer where they would be more effective optically.

Prior art photographic reflective display materials have light sensitive silver halide emulsions coated directly onto a gelatin coated opacified polyester base sheet. Since the emulsion does not contain any materials to opacify the imaging element, white pigments such as $BaSO_4$ have been added to the polyester base sheet to provide an imaging element with both opacity and the desired reflection properties. Also, an optical brightener is added to the polyester base sheet to give the sheet a blue tint in the presence of an ultraviolet light source. The addition of the white pigments into the polyester sheet causes several manufacturing problems which can either reduce manufacturing efficiency or reduce image quality. The addition of white pigment to the polyester base causes manufacturing problems such as die lines and pigment agglomeration which reduce the efficiency at which photographic display material can be manufactured. It would be desirable if the optical brightener, whitener materials, and tints, rather than being dispersed throughout the polyester base sheet, could be concentrated nearer the surface where they would be more effective optically and improve manufacturing efficiency.

Prior art reflective photographic materials with a polyester base use a $TiO_2$ pigmented polyester base onto which light sensitive silver halide emulsions are coated. It has been proposed in WO 94/04961 to use an opaque polyester containing 10% to 25% $TiO_2$ for a photographic support. The $TiO_2$ in the polyester gives the reflective display materials an undesirable opalescence appearance. The $TiO_2$ pigmented polyester also is expensive because the $TiO_2$ must be dispersed into the entire thickness, typically from 100 to 180 $\mu$m. The $TiO_2$ also gives the polyester support a slight yellow tint which is undesirable for a photographic display material. For use as a photographic display material, the polyester support containing $TiO_2$ must be tinted blue to offset the yellow tint of the polyester causing a loss in desirable whiteness and adding cost to the display material. It would be desirable if a reflective display support did not contain any $TiO_2$ in the base and could be concentrated near the light sensitive emulsion.

Prior art photographic display materials, while providing excellent image quality, tend to be expensive when compared with other quality imaging technologies such as ink jet imaging, thermal dye transfer imaging, and gravure printing. Since photographic display materials require an additional imaging processing step compared to alternate quality imaging systems, the cost of a reflective photographic display can be higher than other quality imaging systems. The processing equipment investment required to process photographic reflective display materials also requires consumers to typically interface with a commercial processing lab increasing time to image. It would be desirable if a high quality reflective display support could utilize nonphotographic quality imaging technologies.

Photographic reflective display materials have considerable consumer appeal as they allow images to be printed on high quality support for home or small business use. Consumer use of photographic display materials generally have been cost prohibitive since consumers typically do not have the required volume to justify the use of such materials. It would be desirable if a high quality reflective display material could be used in the home without a significant investment in equipment to print the image.

Prior art photographic display material uses polyester as a base for the support. Typically the polyester support is from 150 to 250 $\mu$m thick to provide the required stiffness. A thinner base material would be lower in cost and allow for roll handling efficiency, as the rolls would weigh less and be smaller in diameter. It would be desirable to use a base material that had the required stiffness but was thinner to reduce cost and improve roll handling efficiency.

PROBLEM TO BE SOLVED BY THE INVENTION

There is a need for a reflective display material having a whiter appearance. There is also a need for reflective display materials that have a wider color gamut and lower cost.

SUMMARY OF THE INVENTION

It is an object of the invention to overcome disadvantages of prior reflective display materials.

It is another object to provide reflective display materials having a wider contrast range.

It is a further object to provide lower cost, high quality reflective display materials.

It is another object to provide a reflective display that utilizes nonphotographic imaging technology.

These and other objects of the invention are accomplished by an imaging element comprising a transparent polymer base, at least one layer of biaxially oriented polyolefin sheet and at least one image layer wherein said polymer sheet has a stiffness of between 20 and 100 millinewtons, and said biaxially oriented polyolefin sheet has a spectral transmission of less than 15%.

ADVANTAGEOUS EFFECT OF THE INVENTION

The invention provides improved reflective display materials that provide whiter whites. The reflective display materials further provide a wider contrast range and sharper images. The invention materials are lower in cost than other reflective display materials.

DETAILED DESCRIPTION OF THE INVENTION

The invention has numerous advantages over prior practices in the art. The reflective display material of the invention has a whiter white than prior photographic materials. Prior photographic materials were somewhat yellow and had a higher minimum density, as there was a large quantity of white pigment in the polymer base sheet. Typically when a large quantity of white $TiO_2$ is loaded into a transparent polymer sheet, it becomes somewhat yellowish rather than being the desired neutral reflective white. The prior art photographic base sheet containing white pigment was required to be quite thick, both to carry the high amount of white pigment, as well as to provide the stiffness required for display materials. It has surprisingly been found that a thinner transparent polymer sheet laminated with a thin biaxially oriented polyolefin sheet has sufficient stiffness for use as a display material, as well as having superior reflective properties. The ability to use less polymer in the transparent polymer sheet results in a cost savings. The display materials of the invention provides sharper images, as they have higher accutance due to the efficient reflective layer on the upper surface of the biaxially oriented polyolefin sheet. There is a visual contrast improvement in the display material of the invention, as the lower density is lower than prior product and the upper amount of density has been visually increased. The display material has a more maximum black, as the reflective properties of the improved base are more specular than the prior materials. As the whites are whiter and the blacks are blacker, there is more range in between and, therefore, contrast is enhanced. The imaging element of this invention utilizes nonphotographic imaging technology to reduce the cost of the final product and improve time to market as time to image with nonphotographic imaging material tend to be faster than photographic imaging systems. Because nonphotographic imaging systems are used, display materials can be more assessable, as digital printing systems are widely available and low in cost. These and other advantages will be apparent from the detailed description below.

The terms as used herein, "top", "upper", "emulsion side", and "face" mean the side or toward the side of the display material where the biaxially oriented sheet is located. The terms "bottom", "lower side", and "back" mean the side or toward the side opposite of the biaxially oriented sheet. The term as used herein, "transparent" means the ability to pass radiation without significant deviation or absorption. For this invention, "transparent" material is defined as a material that has a spectral transmission greater than 90%. For an imaging element, spectral transmission is the ratio of the transmitted power to the incident power and is expressed as a percentage as follows; $T_{RGB}=10^{-D}*100$ where D is the average of the red, green, and blue Status A transmission density response measured by an X-Rite model 310 (or comparable) photographic transmission densitometer.

The layers of the biaxially oriented polyolefin sheet of this invention have levels of voiding, $TiO_2$ and colorants adjusted to provide optimum reflection properties. The biaxially oriented polyolefin sheet is laminated to a transparent polymer base for stiffness for efficient image processing, as well as product handling and display. An important aspect of this invention is the imaging support is coated with nonphotographic imaging layers that allow a reduction in concept to image cycle time. Further, the nonphotographic imaging technologies avoid the need for expensive photoprocessing equipment that is required to process photographic images. The nonphotographic imaging systems also allow home use of the display material of this invention as ink jet printing equipment is widely available. The stiffness benefits from laminating a high strength biaxially oriented polyolefin sheet to polyester provide acceptable stiffness while reducing the thickness and cost of the display materials of the invention. Further, the thin polyolefin skin layer on the top of the biaxially oriented polyolefin sheet of this invention can be optimized for imaging receiving layer adhesion. Another example is a thin layer of biaxially oriented polycarbonate allows a solvent based polycarbonate dye receiver layer typical of thermal dye transfer imaging to adhere to the base without an expensive primer coating.

Any suitable biaxially oriented polyolefin sheet may be utilized for the sheet on the top side of the laminated base of the invention. It is preferred that one sheet of biaxially oriented sheet be laminated only to the top of the transparent support sheet to form the laminated base for the imaging element. A second biaxially oriented polyolefin sheet could be placed on the bottom but would not improve performance significantly but would add to cost. Microvoided composite biaxially oriented sheets are preferred because the voids provide opacity without the use of $TiO_2$. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

should be between 45% and 100%, preferably between 67% and 100%. As the percent solid density becomes less than 67%, the composite sheet becomes less manufacturable due to a drop in tensile strength, and it becomes more susceptible to physical damage.

The total thickness of the composite sheet can range from 12 to 100 $\mu$m, preferably from 20 to 70 $\mu$m. Below 20 $\mu$m, the microvoided sheets may not be thick enough to minimize any inherent non-planarity in the support and would be more difficult to manufacture. At thickness higher than 70 $\mu$m, little improvement in either surface smoothness or mechanical properties are seen, and so there is little justification for the further increase in cost for extra materials.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells and, thus, there is virtually no path open from one side of the voided core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene, and the cross-linking agent is divinylbenzene.

Processes well known in the art yield nonuniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads, or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not degrade the performance of the imaging element in which the biaxially oriented polyolefin film is utilized.

For the biaxially oriented sheets on the top side toward the emulsion, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The integral nonvoided skin layers of the biaxially oriented top sheets can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the topmost skin layer or exposed surface layer should be between 0.20 $\mu$m and 1.5 $\mu$m, preferably between 0.5 and 1.0 $\mu$m. Below 0.5 $\mu$m any inherent non-planarity in the coextruded skin layer may result in unacceptable color variation. At skin thickness greater than 1.0 μm, there is a reduction in the nonphotographic optical properties such as image resolution. At thickness greater that 1.0 μm there is also a greater material volume to filter for contamination such as clumps, poor color pigment dispersion, or contamination.

Addenda may be added to the topmost skin layer to change the color of the imaging element. For nonphotographic use, a white base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

It has been found that a very thin coating (0.2 to 1.5 μm) on the surface immediately below the emulsion layer can be made by coextrusion and subsequent stretching in the width and length direction. It has been found that this layer is, by nature, extremely accurate in thickness and can be used to provide all the color corrections which are usually distributed throughout the thickness of the sheet between the emulsion and the transparent base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used and high quality filtration to clean up the colored layer polymer prior to extension is much more feasible since the total volume of polymer with colorant is only typically 2 to 10 percent of the total polymer between the base and the imaging receiver layer.

The top skin layer of the biaxially oriented polyolefin sheet can also aid in the adhesion of the imaging receiving layers to the support. The topmost skin layer can be optimized to provide a thin layer to promote image receiving layer adhesion without the use of an primer coating that is typical in some prior art imaging systems. Examples include a top skin layer of polycarbonate, polyethylene or polystyrene.

While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 μm does not substantially improve the optical properties of the support, will add cost to the design, and will cause objectionable pigments lines in the extrusion process.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed under lighting that contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The addenda are added to achieve the preferred emission between 1 and 5 delta b* units and provide the customer preferred blue white. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add optical brightener to the biaxially oriented sheet to achieve less than 1 b*. An emission greater that 5 b* units would interfere with the color balance of the prints making the whites appear too blue for most consumers.

The preferred addenda of this invention is an optical brightener. An optical brightener is a colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol.

The optical brightener may be added to any layer in the multilayer coextruded biaxially oriented polyolefin sheet. The preferred locations are adjacent to or in the topmost surface layer of the biaxially oriented sheet. This allows for the efficient concentration of optical brightener which results in less optical brightener being used when compared to traditional imaging supports. When the desired weight % loading of the optical brightener begins to approach the concentration at which the optical brightener migrates to the surface of the support forming crystals in the imaging layer, the addition of optical brightener into the layer adjacent to the exposed layer is preferred. When optical brightener migration is a concern as with digital imaging systems, the preferred exposed layer comprised polyethylene. In this case, the migration from the layer adjacent to the exposed layer is significantly reduced allowing for much higher optical brightener levels to be used to optimize image quality. Locating the optical brightener in the layer adjacent to the exposed layer allows for a less expensive optical brightener to be used as the exposed layer, which is substantially free of optical brightener and which prevents significant migration of the optical brightener. Another preferred method to reduce unwanted optical brightener migration is to use polypropylene for the optical brightener contaiaining layer adjacent to the exposed surface. Since optical brightener is more soluble in polypropylene than polyethylene, the optical brightener is less likely to migrate from polypropylene.

A biaxially oriented sheet of this invention which has a microvoided core is preferred. The microvoided core adds opacity and whiteness to the imaging support further improving imaging quality. Combining the image quality advantages of a microvoided core with a material which absorbs ultraviolet energy and emits light in the visible spectrum allows for the unique optimization of image quality, as the image support can have a tint when exposed to ultraviolet energy, yet retain excellent whiteness when the image is viewed using lighting that does not contain high amounts of ultraviolet energy such as some types of indoor lighting. The preferred number of voids in the vertical direction at substantially every point is greater than six. The number of voids in the vertical direction is the number of polymer/gas interfaces present in the voided layer. The voided layer functions as an opaque layer because of the index of refraction changes between polymer/gas interfaces. Greater than six voids are preferred because at four voids or less, little improvement in the opacity of the film is observed and, thus, does not justify the added expense to void the biaxially oriented sheet of this invention.

The biaxially oriented sheet may also contain pigments which are known to improve the imaging responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for an imaging system are DuPont Chemical Co. R101 rutile $TiO_2$ and DuPont Chemical Co. R104 rutile $TiO_2$. Other pigments to improve imaging responses may also be used in this invention such as barium sulfate, clay, or calcium carbonate. The preferred amount of $TiO_2$ added to the biaxially oriented sheet of this invention is between 18% and 24% by weight. Below 12% $TiO_2$, the required reflection density of the biaxially oriented sheet is difficult to obtain. Above 28% $TiO_2$, manufacturing efficiency declines because of problems extruding large amounts of $TiO_2$ compared with the base polymer. Examples of manufacturing problems include plate out on the screw, die manifold, die lips, extrusion screw wear, and extrusion barrel life The preferred spectral transmission of the biaxially oriented polyolefin sheet of this invention is less than 15%. Spectral transmission is the amount of light energy that is transmitted through a material. For an imaging element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The higher the transmission, the less opaque the material. For a reflective imaging display material, the quality of the image is related to the amount of light reflected from the image to the observer's eye. A reflective image with a high amount of spectral transmission does not allow sufficient light to reach the observer's eye causing a perceptual loss in image quality. A reflective image with a spectral transmission of greater than 20% is unacceptable for a reflective display material, as the quality of the image cannot match prior art imaging reflective display materials.

A reflection density of greater than 85% for the biaxially oriented sheet of this invention is preferred. A reflection density between 85% and about 100% is suitable. Reflection density is the amount of light energy reflecting from the image to an observer's eye. Reflection density is measured by 0°/45° geometry Status A red/green/blue response using an X-Rite model 310 (or comparable) photographic transmission densitometer. A sufficient amount of reflective light energy is required to give the perception of image quality. A reflection density less than 75% is unacceptable for a reflective display material and does not match the quality of prior art reflective display materials.

The coextrusion, quenching, orienting, and heat setting of these integral composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers, while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion, or look to the support and imaging element. The biaxially oriented extrusion could be carried out with as many as 10 layers if desired to achieve some particular desired property.

These composite sheets may be coated or treated after the coextrusion and orienting process, or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and coating polyvinylidene chloride for heat seal properties. Further examples include flame, plasma, or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented sheet of the invention where the exposed surface layer is adjacent to the imaging layer is as follows:

polyethylene exposed surface layer
polypropylene layer
polypropylene microvoided layer
polypropylene bottom layer The support to which the microvoided composite sheets and biaxially oriented sheets are laminated for the laminated support of the imaging layer may be any material with the desired transmission and stiffness properties. Imaging elements of the invention can be prepared on any suitable transparent imaging quality support including materials such as polyalkyl acrylates or methacrylates, polystyrene, polyamides such as nylon, sheets of semisynthetic high molecular weight materials such as cellulose nitrate, cellulose acetate butyrate, and the like; homo and copolymers of vinyl chloride, poly(vinylacetal), polycarbonates, homo and copolymers of olefins such as polyethylene and polypropylene, and the like.

Polyester sheets are particularly advantageous because they provide excellent strength and dimensional stability. Such polyester sheets are well known, widely used, and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from 2 to 12 carbon atoms such as, for example, ethylene glycol, propylene glycol, trimethylene glycol, hexamethylene glycol, decamethylene glycol, dodecamethylene glycol, 1,4-cyclohexane, dimethanol, and the like.

Suitable dibasic acids useful for the preparation of polyesters include those containing from 2 to 16 carbon atoms such as adipic acid, sebacic acid, isophthalic acid, terephthalic acid, and the like. Alkyl esters of acids such as those listed above can also be employed. Other alcohols and acids, as well as polyesters, prepared therefrom and the preparation of the polyesters are described in U.S. Pat. Nos. 2,720,503 and 2,901,466. Polyethylene terephthalate is preferred.

Polyester support thickness can range from about 15 millinewtons to 100 millinewtons. The preferred stiffness is between 20 and 100 millinewtons. Polyester stiffness less than 15 millinewtons does not provide the required stiffness for display materials in that they will be difficult to handle and do not lay flat for optimum viewing. Polyester stiffness greater than 100 millinewtons begins to exceed the stiffness limit for processing equipment and has no performance benefit for the display materials.

Generally polyester films supports are prepared by melt extruding the polyester through a slit die, quenching to the amorphous state, orienting by machine and cross direction stretching and heat setting under dimensional restraint. The polyester film can also be subjected to a heat relaxation treatment to improve dimensional stability and surface smoothness.

The polyester film will typically contain an undercoat or primer layer on both sides of the polyester film. Subbing layers used to promote adhesion of coating compositions to the support are well known in the art and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; and 3,501,301. The polymeric subbing layer is usually overcoated with a second subbing layer comprised of gelatin, typically referred to as gel sub.

A transparent polymer base substantially free of white pigment is preferred because the white pigment in the transparent polymer gives the reflective display materials an undesirable opalescent appearance. The white pigmented transparent polymer also is expensive because the white pigment must be dispersed into the entire thickness, typically from 100 to 180 µm. The white pigment also gives the transparent polymer support a slight yellow tint which is undesirable for an imaging display material. For use as a reflective display material, a transparent polymer support containing white pigment must also be tinted blue to offset the yellow tint of the polyester causing a loss in desired whiteness and adding cost to the display material. Concentration of the white pigment in the polyolefin layer allows for efficient use of the white pigment which improves image quality and reduces the cost of the imaging support as the amount of required white pigment is reduced.

When using a polyester base, it is preferable to extrusion laminate the microvoided composite sheets to the transparent base using a polyolefin resin. Extrusion laminating is carried out by bringing together the biaxially oriented sheets of the invention and the polyester base with application of a melt extruded adhesive between the polyester sheets and the biaxially oriented polyolefin sheets followed by their being pressed in a nip such as between two rollers. The melt extruded adhesive may be applied to either the biaxially oriented sheets or the transparent base prior to their being brought into the nip for lamination. In a preferred form the adhesive is applied into the nip simultaneously with the biaxially oriented sheets and the transparent base. The adhesive used to adhere the biaxially oriented polyolefin sheet to the polyester base may be any suitable material that does not have a harmful effect upon the imaging element. A preferred material is metallocene catalyzed ethylene plastomers that are melt extruded into the nip between the base and the biaxially oriented sheet. Metallocene catalyzed ethylene plastomers are preferred because they are easily melt extruded, adhere well to biaxially oriented polyolefin sheets of this invention, and adhere well to gelatin sub polyester support of this invention.

The preferred stiffness of the laminated transparent polymer base of this invention is between 60 and 500 millinewtons. At stiffness less than 50 millinewtons, the support becomes difficult to convey through digital imaging equipment such as ink jet printers or gravure printing equipment, such as a six-color printing press. At stiffness greater than 650 millinewtons, the support becomes too stiff to bend over transport rollers during manufacturing and web paths typical to digiital printers. Further, an increase in stiffness beyond 650 millinewtons does not significantly benefit the consumer, so the increased cost to provide materials with stiffness greater than 650 millinewtons is not justified.

The structure of a preferred display support where the imaging layers are applied to the biaxially oriented polyolefin sheet is as follows:

---

Biaxially oriented polyolefin sheet
Metallocene catalyzed ethylene plastomer (binder)
Polyester base

---

As used herein, the phrase "imaging element" is a material that utilizes nonphotographic technology in the formation of images. The imaging elements can be black-and-white, single color elements, or multicolor elements. Nonphotographic imaging methods include thermal dye transfer, ink jet, electrophotographic, electrographic, flexographic printing, or rotogravure printing. The imaging layers may be coated on the top side, the bottom side, or both sides.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 g/m². An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating a dye-donor element and transferring a dye image to a dye-receiving element as described above to form the dye transfer image.

In a preferred embodiment of the thermal dye transfer method of printing, a dye donor element is employed which compromises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element, and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and patents. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, copiers use imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created iono-graphically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper.

The dye receiving layer or DRL for ink jet imaging may be applied by any known methods, such as solvent coating, or melt extrusion coating techniques. The DRL is coated over the tee layer (TL) at a thickness ranging from 0.1 to 10 μm, preferably 0.5 to 5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al., in U.S. Pat. Nos. 4,879,166; 5,264,275; 5,104,730; 4,879,166; and Japanese Patents 1,095,091; 2,276,671; 2,276,670; 4,267,180; 5,024,335; and 5,016,517 disclose aqueous based DRL formulations comprising mixtures of pseudo-bohemite and certain water soluble resins. Light, in U.S. Pat. Nos. 4,903,040; 4,930,041; 5,084,338; 5,126,194; 5,126,195; 5,139,8667; and 5,147,717 disclose aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317, and Higuma et al, in U.S. Pat. No. 5,059,983 disclose aqueous-coatable DRL formulations based on poly (vinyl alcohol). Iqbal in U.S. Pat. No. 5,208,092 discloses water-based ink receiving layer (IRL) formulations comprising vinyl copolymers which are subsequently crosslinked. In addition to these examples, there may be other known or contemplated DRL formulations which are consistent with the aforementioned primary and secondary requirements of the DRL, all of which fall under the spirit and scope of the current invention.

The preferred DRL is a 0.1 to 10 $\mu$m DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717; in European Patent Specification 0 524 626, and also in pending U.S. patent applications based on DN 71302. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing is generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks, an ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

The imaging elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

The following examples illustrate the practice of this invention. They are not intended to be exhaustive of all possible variations of the invention. Parts and percentages are by weight unless otherwise indicated.

EXAMPLES

Example 1

In this example, a transparent polyester base materials was laminated with a microvoided biaxially oriented polyolefin sheet containing blue tints, optical brightener and TiO$_2$. The support structure in this example was coated with an ink jet printing dye receiver layer. This example will show the desirable increase in stiffness when the biaxially oriented sheet is laminated to the polyester sheet. Further, this example will also show that a superior reflective display image was formed on the invention The following laminated imaging display material of the invention was prepared by extrusion laminating the following sheet to top side of a imaging grade polyester base:
Top Sheet (Emulsion side):

A composite sheet consisting of 5 layers identified as L1, L2, L3, L4, and L5. L1 is the thin colored layer on the top of the biaxially oriented polyolefin sheet to which the photosensitive silver halide layer was attached. L2 is the layer to which optical brightener and TiO$_2$ was added. The optical brightener used was Hostalux KS manufactured by Ciba-Geigy. The rutile TiO$_2$ used was DuPont R104 (a 0.22 $\mu$m particle size TiO$_2$). Table 1 below lists the characteristics of the layers of the top biaxially oriented sheet used in this example.

TABLE 1

| Layer | Material | Thickness, $\mu$m |
|---|---|---|
| L1 | LD Polyethylene + color concentrate | 0.75 |
| L2 | Polypropylene + TiO$_2$ + OB | 4.32 |
| L3 | Voided Polypropylene | 24.9 |
| L4 | Polypropylene | 4.32 |
| L5 | Polypropylene | 0.762 |
| L6 | LD Polyethylene | 11.4 |

Photographic grade polyester base:

A polyethylene terephthalate base 110 $\mu$m thick was transparent and gelatin subbed on both sides of the base. The polyethylene terephthalate base had a stiffness of 30 millinewtons in the machine direction and 40 millinewtons in the cross direction.

The top sheet used in this example was coextruded and biaxially oriented. The top sheet was melt extrusion laminated to the polyester base using a metallocene catalyzed ethylene plastomer (SLP 9088) manufactured by Exxon Chemical Corp. The metallocene catalyzed ethylene plastomer had a density of 0.900 g/cc and a melt index of 14.0.

The L3 layer for the biaxially oriented sheet is microvoided and further described in Table 2 where the refractive index and geometrical thickness is shown for measurements made along a single slice through the L3 layer; they do not imply continuous layers, a slice along another location would yield different but approximately the same thickness. The areas with a refractive index of 1.0 are voids that are filled with air, and the remaining layers are polypropylene.

TABLE 2

| Sublayer of L3 | Refractive Index | Thickness, μm |
| --- | --- | --- |
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

An ink jet image receiving layer was utilized to prepare the reflective display material of this example and was coated on the L1 polyethylene. layer on the top biaxially oriented sheet. The ink jet image receiving layer was coated by means of an extrusion hopper a dispersion containing 326.2 g of gelatin, 147 g of BVSME hardener, i.e., (bis (vinylsulfonylmethyl) ether 2% solution in water, 7.38 g of a dispersion containing 2.88 g of 11.5 μm polystyrene beads, 0.18 g of Dispex™ (40% solution in water obtained from Allied Colloids, Inc.), and 4.32 g of water, and 3.0 g of a 20% solution in water of Surfactant 10G (nonylphenoxypolyglycidol) obtained from Olin Matheson Company. The thickness was about 5 μm (dried thickness).

Onto this layer was coated by means of an extrusion hopper an aqueous solution containing 143.5 g of a 3% solution in water of 4.42 g of hydroxypropyl cellulose (Methocel KLV100, Dow Chemical Company), 0.075 g of vanadyl sulfate, 2-hydrate obtained from Eastman Kodak Company, 0.075 g of a 20% solution in water of Surfactant 10G (nonylphenoxypolyglycidol) obtained from Olin Matheson Company, and 145.4 g of water; and 0.45 g of a 20% solution in water of Surfactant 10G (nonylphenoxypolyglycidol) obtained from Olin Matheson Company and 79.5 g of water to form an ink-receiving layer about 2 μm in thickness (dry thickness).

The bending stiffness of the polyester base and the laminated display material support was measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. In this test the stiffness in both the machine direction and cross direction of the polyester base was compared to the stiffness of the base laminated with the top biaxially oriented sheet of this example. The results are presented in Table 3.

TABLE 3

| | Machine Direction Stiffness (millinewtons) | Cross Direction Stiffness (millinewtons) |
| --- | --- | --- |
| Before Lamination | 33 | 23 |
| After Lamination | 87 | 80 |

The data above in Table 3 show the significant increase in stiffness of the polyester base after lamination with a biaxially oriented polymer sheet. This result is significant in that prior art display materials, in order to provide the necessary stiffness, used polyester and paper bases that were much thicker (between 150 and 256 μm) compared to the 110 μm polyester base used in this example. At equivalent stiffness, the significant increase in stiffness after lamination allows for a thinner polyester base to be used compared to prior art display materials, thus reducing the cost of the reflective display support. Further, a reduction in reflective display material thickness allows for a reduction in material handling costs as rolls of thinner material weigh less and are smaller in roll diameter.

The display material of this example was printed with various test images on a Hewlett Packard DeskJet 870 Cxi ink jet printer. The display support was measured for spectral transmission using an X-Rite Model 310 photographic densitometer.

The reflective display support coated with the ink jet receiving layer of this example exhibits all the properties needed for an imaging display material. The invention in this example has many advantages over prior art imaging display materials. The nonvoided layers have levels of $TiO_2$ and colorants adjusted to provide an improved minimum density position compared to paper and polyester bases, as the invention was able to overcome the native yellowness of the processed gelatin ink receiving layers. For the invention, inclusion of an optical brightener and additional $TiO_2$ would further enhance the apparent whiteness of the processed material.

Further, the blue tints and white pigments for the invention are concentrated in a thin layer below the emulsion compared to prior art photographic reflective display materials which use bases that have white pigments, optical brightener, and tint materials dispersed in the entire thickness of the base material. Concentration of the tint materials and the white pigments allows for improved manufacturing efficiency and lower material utilization resulting in a lower cost display material. The invention had a spectral transmission of 13% providing an ideal base for reflective viewing. The invention would be low in cost, as a thin polyester base was used while maintaining the required stiffness. Finally, since a thin skin of polyethylene was used on the top of the biaxially oriented sheet, no expensive primer coating was required, as the gelatin based ink jet dye receiving layer adheres well to polyethylene.

The invention has been described in detail with particular reference to preferred embodiments thereof, but it will be understood that variations and modifications can be effected within the spirit and scope of the invention.

What is claimed is:

1. An imaging element comprising a transparent polymer sheet, at least one layer of biaxially oriented polyolefin sheet and at least one image layer wherein said polymer base has a stiffness of between 20 and 100 millinewtons, and said biaxially oriented polyolefin sheet has a spectral transmission of less than 15%.

2. The imaging element of claim 1 wherein said biaxially oriented polyolefin sheet is substantially opaque and contains white pigment.

3. The imaging element of claim 2 wherein said biaxially oriented polyolefin sheet further comprises microvoids.

4. The imaging element of claim 3 wherein said microvoids comprise at least one layer of said biaxially oriented polyolefin sheet and have at least 6 voids in the vertical direction at substantially every point of the biaxially oriented polyolefin sheet.

5. The imaging element of claim 3 wherein titanium dioxide is in a layer above a layer that contains said microvoids in said biaxially oriented polyolefin sheet.

6. The imaging element of claim 3 wherein said element has a reflection density of at least 85%.

7. The imaging element of claim 3 wherein said transparent polymer sheet is substantially free of pigment.

8. The imaging element of claim 2 wherein said biaxially oriented polyolefin sheet contains optical brightener.

9. The imaging element of claim 1 wherein said biaxially oriented polyolefin sheet has an integral layer of polyethylene on the top of said sheet.

10. The imaging element of claim 1 wherein said biaxially oriented polyolefin sheet comprises between 18 and 24 weight percent of titanium dioxide.

11. The imaging element of claim 1 wherein said element has a stiffness of between 60 and 500 millinewtons.

12. The element of claim 1 wherein said element comproses at least one electrophotographic receiving layer.

13. The element of claim 1 wherein said element comprises at least one printing ink receiving layer.

14. The element of claim 1 further comprising a dye receiving layer on the top of said biaxially oriented polyolefin sheet.

15. The element of claim 1 wherein there is no biaxially oriented polyolefin sheet on the bottom of said element.

16. The element of claim 1 wherein said transparent polymer sheet comprises polyester.

17. An imaging element comprising a transparent polymer sheet, at least one layer of biaxially oriented polyolefin sheet and at least one image layer wherein said polymer base has a stiffness of between 20 and 100 millinewtons, said biaxially oriented polyolefin sheet has a spectral transmission of less than 15% and said element comprises at least one thermal dye transfer receiving layer.

18. The imaging element of claim 17 wherein said biaxially oriented polyolefin sheet is substantially opaque and contains white pigment.

19. The imaging element of claim 18 wherein said biaxially oriented polyolefin sheet further comprises microvoids.

20. The imaging element of claim 19 wherein said biaxially oriented polyolefin sheet has an integral layer of polyethylene on the top of said sheet.

21. The imaging element of claim 18 wherein said element has a reflection density of at least 85%.

22. The imaging element of claim 19 wherein said biaxially oriented polyolefin sheet contains optical brightener.

23. The element of claim 18 wherein said dye transfer receiving layer is on the top of said biaxially oriented polyolefin sheet.

24. The element of claim 23 wherein there is no biaxially oriented polyolefin sheet on the bottom of said element.

25. An imaging element comprising a transparent polymer sheet, at least one layer of biaxially oriented polyolefin sheet and at least one image layer wherein said polymer base has a stiffness of between 20 and 100 millinewtons, said biaxially oriented polyolefin sheet has a spectral transmission of less than 15% and said element comprises at least one ink jet receiving layer.

26. The imaging element of claim 25 wherein said biaxially oriented polyolefin sheet is substantially opaque and contains white pigment.

27. The imaging element of claim 26 wherein said biaxially oriented polyolefin sheet further comprises microvoids.

28. The imaging element of claim 27 wherein said microvoids comprise at least one layer of said biaxially oriented polyolefin sheet and have at least 6 voids in the vertical direction at substantially every point of the biaxially oriented polyolefin sheet.

29. The imaging element of claim 27 wherein said biaxially oriented polyolefin sheet has an integral layer of polyethylene on the top of said sheet.

30. The element of claim 29 wherein said transparent polymer sheet comprises polyester.

31. The imaging element of claim 27 wherein titanium dioxide is in a layer above a layer that contains said microvoids in said biaxially oriented polyolefin sheet.

32. The imaging element of claim 27 wherein said biaxially oriented polyolefin sheet contains optical brightener.

33. The element of claim 27 further comprising a dye receiving layer on the top of said biaxially oriented polyolefin sheet.

\* \* \* \* \*